May 24, 1932.　　　　F. J. SHOOK　　　　1,859,538
TIRE BUILDING MACHINE
Filed Dec. 12, 1929　　　2 Sheets-Sheet 1

Inventor
Florain J. Shook,
By Robert M. Pierson,
Attorney

May 24, 1932.  F. J. SHOOK  1,859,538
TIRE BUILDING MACHINE
Filed Dec. 12, 1929  2 Sheets-Sheet 2

Inventor
Florain J. Shook,
By Robert M. Pierson,
Attorney

Patented May 24, 1932

1,859,538

UNITED STATES PATENT OFFICE

FLORAIN J. SHOOK, OF AKRON, OHIO, ASSIGNOR TO NATIONAL RUBBER MACHINERY COMPANY, OF AKRON, OHIO, A CORPORATION OF OHIO

TIRE BUILDING MACHINE

Application filed December 12, 1929. Serial No. 413,510.

This invention relates to tire-building machines, and more particularly to those of the flat or semi-flat drum type, on which plies of tire material are laid to form a spread-out or substantially flat band which is then taken from the machine and shaped to the form of a pneumatic tire casing by expanding the middle of the band and bringing its bead edges together.

My invention has for its principal object to provide an improved tire-building machine of the drum type equipped with one or more stitching tools so related to the drum as to be movable into and out of contact with the material thereon and mechanically mounted and guided in their feed movements so as properly to roll the components of the tire band together.

A further object is to provide an improved automatic machine of this type adapted to be manually set in motion and then to perform a full cycle of operation of the stitchers and finally come to a stop.

Of the accompanying drawings, Fig. 1 is a plan view showing an automatic drum-tire stitcher mechanism embodying my invention in a preferred form.

Figure 1:
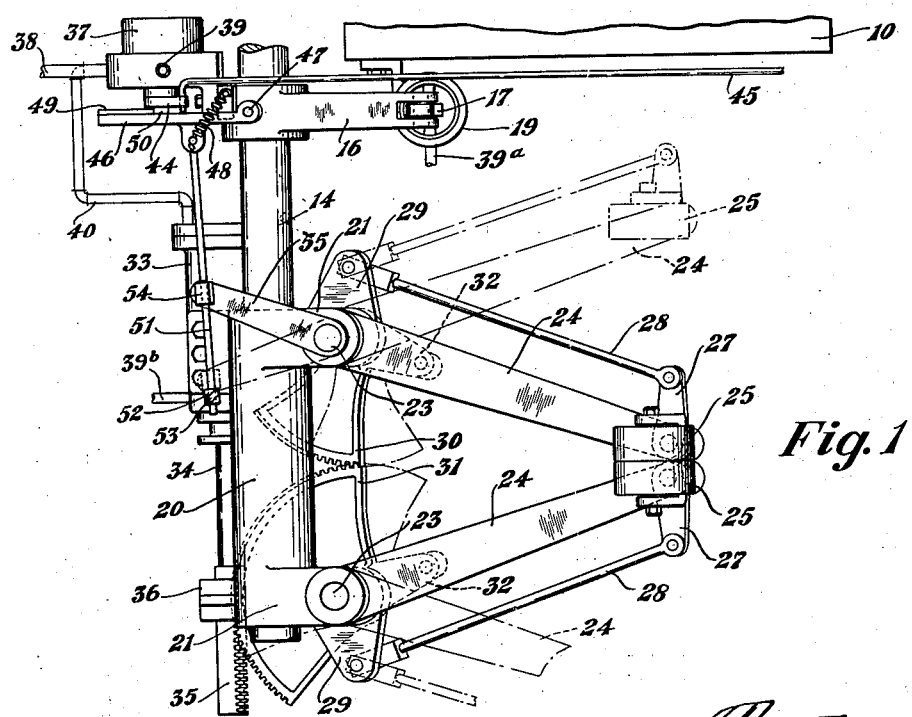

Referring at first to Figs. 1 to 5 inclusive, 10 is a portion of the frame or casing of the machine and 11 is a portion of a semi-flat rotary band-building drum mounted on a horizontal shaft (not shown) and adapted to be rotated by suitable driving mechanism within the casing 10, said drum including a substantially flat or cylindrical middle portion 12 and conical bead seat portions 13 at the ends, depressed from the portions 12. 14 is a horizontal rock-shaft mounted behind and below the drum 11, to turn in a bearing 15 located on the rear wall of the casing 10, said shaft projecting laterally from the casing, parallel with the axis of drum 11. To the shaft 14 is affixed a forwardly-projecting arm 16 whose outer end is connected by a link 17 with the piston 18 of a fluid-pressure cylinder 19, for rocking the shaft to elevate the stitchers. When said cylinder is discharged, the arms return by gravity to their depressed positions indicated by the broken lines in Fig. 2.

Fixed to the shaft 14 is a hub member 20 having two pairs of forwardly-projecting upper and lower bearing ears or hinge members 21 and 22 in which are journaled the pivot pins 23 of a pair of stitcher arms 24 mounted tangentwise of the drum 11, below the latter, so as to swing in planes parallel with the axis of rotation of drum 11, lengthwise of said drum.

25, 25 are a pair of rollers commonly known as stitchers or stitcher wheels mounted at the outer ends of the arms 24 for rolling down upon each other and compacting the plies of tire-band material upon the drum 11 to improve the adhesion of said plies and the other components of the bands, such as the bead parts. These stitcher wheels are loosely journaled on short horizontal shafts carried by a pair of rock-levers 26 mounted on upright shafts 270 which turn in bearings at the outer ends of the stitcher arms. Each rock-shaft is provided with a laterally-projecting arm 27 connecting by a link 28 with a parallel fixed arm 29 of equal length cast on one of the lower bearing ears 22, so that the plane of each roller 25 will be maintained in parallelism in the different angular positions of the stitcher arms as indicated respectively in full and broken lines in Fig. 1. I do not limit myself to making the stitcher wheels 25 of broad-faced cylindrical form and mounting them in vertical planes as shown, but may employ any other suitable form or arrangement.

The stitcher arms 24 are inter-geared to swing through equal angles in opposite directions by means of a relatively short-arc gear segment 30 on the right-hand arm and a relatively long-arc gear segment 31 on the left-hand arm, these segments being attached to the lower ends of the pintles 23 underneath the lower ears 22 and also having forwardly-projecting arms 32 integral with their hub portions and pinned to the lower sides of the respective stitcher arms.

For swinging the stitcher arms to impart the outward feeding and return movements thereto, I provide a horizontal, double-acting fluid-pressure cylinder and piston motor or ram device 33 bolted to the hub member 20 near the inner end of the latter and having a plunger extension or piston-rod 34 formed at its outer end with a toothed rack 35 mounted in a guide 36 on the hub casting and meshing with the gear segment 31 at a point substantially 90° around from the meshing point of the gear segment 30. This ram device may be actuated by compressed air or other suitable pressure fluid. Hydraulic pressure is preferred when available in the tire room on account of its inelastic nature which avoids overthrow of the stitchers when they run off the edges of the tire band. Any other suitable form of motor may be substituted. By providing a separate motor whose speed does not depend upon that of the drum 11, I am enabled to impart any desired rate of feed movement to the stitchers.

For controlling the cylinders 19 and 33, a valve device 37, which may have any suitable construction for performing the desired functions, is attached to the hub of the arm 16 on rock-shaft 14, opposite to said arm. With the casing of said valve device are connected a pressure-supply pipe 38, a valve-controlled pipe 39 having branches 39ᵃ and 39ᵇ leading respectively to the cylinder 19 and the forward end of cylinder 33, and a valve-controlled pipe 40 leading to the rear end of cylinder 33.

Figure 5:
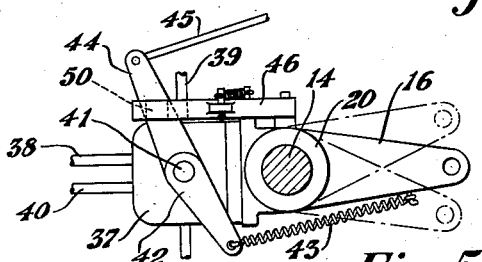
Fig. 5 is a side elevation and section from the plane 5—5 of Fig. 4.
Figure 4:
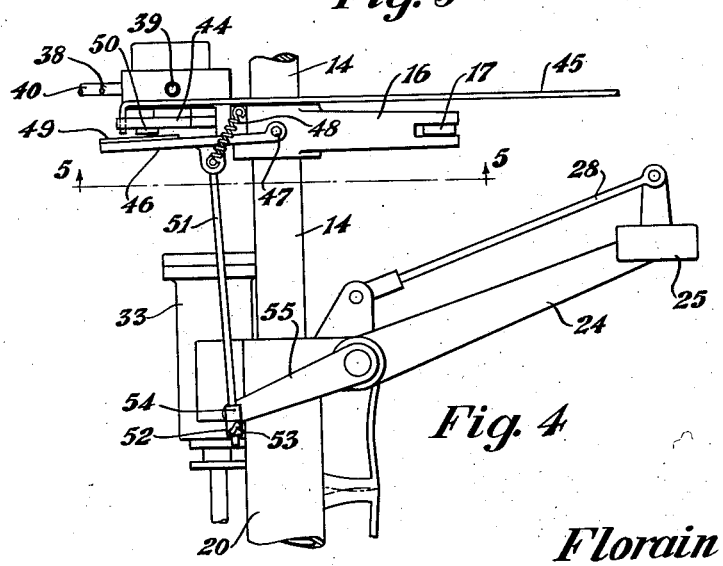
Fig. 4 is a partial plan view showing one of the stitchers at the outer end of its stroke, this view being taken as though the parts were horizontal instead of partly tipped up as in Fig. 1.

On the end of the valve shaft 41 is mounted a lever having a downwardly-projecting arm 42, to which is attached a pull-spring 43 for turning the valve counter-clockwise as seen in Fig. 5, and an upwardly-projecting arm 44 to which is connected a manual pull-rod 45 leading to any convenient handle or hand-lever within reach of the operator. 46 is a latch pivoted at 47 to the hub of the rock-arm 16 and yieldingly drawn into latching position by a pull-spring 48, said latch having a projection 49 adapted to engage a projection 50 on the valve arm 44 to hold the latter in its position for charging the cylinder 19 and the forward end of cylinder 33 when said arm has been moved clockwise to that position by means of the manual rod 45, and to rest against the outer face of said projection 50 as indicated in Fig. 4 when the valve-arm has been unlatched and moved to the opposite position.

For tripping the latch 46 by the traverse of the right-hand stitcher arm 24 at the outer end of its stroke, I provide a trip-rod 51 pivoted at one end to the latch and having at its other end a tripping collar 52, adjustably fixed on the rod by means of a thumb-screw 53 to obtain the proper setting thereon, and adapted to be engaged by a contact block 54 which slidingly surrounds and guides the rod 51 and is pivotally mounted at the rear end of an arm 55 fixed to the upper end of the hinge pintle 23 of said stitcher arm.

Figure 2:
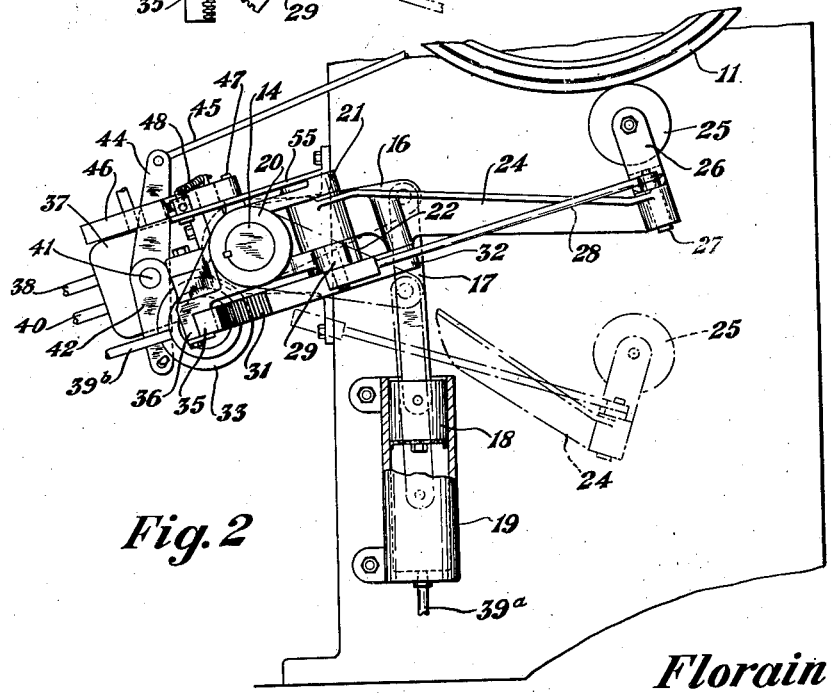
Fig. 2 is a side elevation thereof, partly in section.
Figure 3:
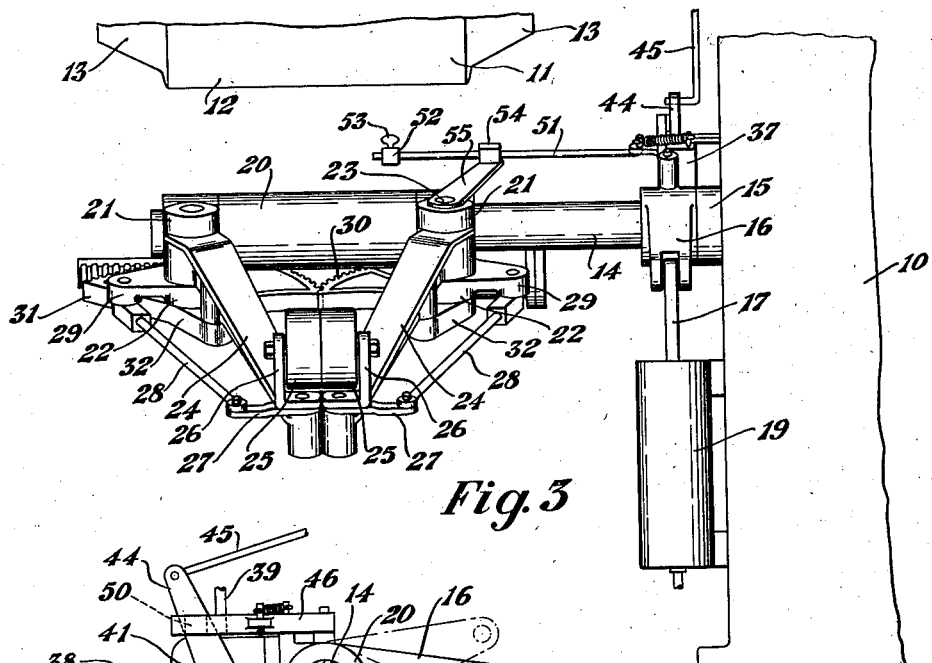
Fig. 3 is a front elevation.

In the operation of this form of my invention, assuming the parts to be in the positions indicated in Figs. 1 and 3, with the stitchers 25 together at the inner end of their stroke and depressed away from the drum 11, and the drum in rotation with tire material thereon, the stitcher mechanism is started in motion by pulling the manual control rod 45 to move the valve-lever 42, 44 to the position indicated in Fig. 2, in which position it is held by the latch 46. Thereby pressure fluid is admitted through the pipes 39, 39ᵃ and 39ᵇ to the cylinder 19 and the front end of cylinder 33, the stitcher arms 24 are elevated by the piston 18 in a direction substantially radial to the drum to bring their rollers 25 into contact with the material on the drum, and the rack 35 is retracted by the piston of cylinder 33 to swing the arms apart and feed their rollers slowly over the drum as the latter rotates, thereby compacting the layers of material in the tire band upon each other. At the completion of the outward movement of the stitchers, the contact block 54 on the arm 55 attached to one of the stitcher arms encounters the tripping collar 52 on the rod 51, thereby withdrawing the latch 46, releasing the valve-lever 42, 44 and allowing its spring 43 to move it to the position indicated in Fig. 5, thus restoring the valve to its initial position, discharging the cylinder 19 and allowing the gravity bias of the stitchers to drop them to their inoperative position indicated in Fig. 3, discharging the front end of cylinder 33 and admitting pressure fluid to its rear end, whereby the rack 35 is pushed out and the stitcher arms 24 are swung toward each other and finally brought together as indicated in Fig. 1, thus completing an automatic cycle of the machine. The pressure remains on the rear end of cylinder 33 until ready for the next operation, and the cycle is then repeated on a succeeding ply of material or on another band which has been applied to the drum in the meantime.

The form of embodiment might be modified without departing from the scope of my invention and it is not intended to limit the latter except as defined in the claims.

I claim:

1. In a tire-building machine, the combination of a rotary band-building drum, a stitcher movable thereover, a stitcher-carrying arm pivoted for swinging stitcher-feeding and return movements lengthwise of the drum, and a support for said arm pivoted for moving the arm toward and away from the drum axis.

2. In a tire-building machine, the combination of a pair of stitcher wheels, inter-geared, oppositely movable supports carrying said wheels, and a hub carrying said supports and pivoted to move the stitcher wheels substantially radially of the drum axis into and out of operative position.

3. In a tire-building machine, the combination of a rotary drum, a stitcher having transverse feeding and return movements thereover, a stitcher-supporting arm pivoted for movement in planes tangent to the drum for imparting said movements, and mechanism for swinging said arm.

4. In a tire-building machine, the combination of a horizontal rotary tire drum, a pair of stitcher wheels coacting therewith, and a pair of arms mounted tangentwise of said drum and carrying the stitcher wheels, said arms being interconnected for opposite, lateral stitcher-feeding and return movements and also pivotally mounted for positioning movements with respect to the drum.

5. In a tire-building machine, the combination of a tire form, a stitcher, a movable carrier for feeding said stitcher over the form, a hub supporting said carrier and pivoted to move the stitcher toward and from the drum, and a fluid-pressure ram device having a plunger movable axially of said hub and geared to the carrier for imparting the stitcher-feeding and return movements to said carrier.

6. In a tire-building machine, the combination of a tire drum, a pair of stitcher wheels movable thereover, a pair of inter-geared, laterally-swinging arms carrying said stitchers, a pivoted hub carrying said arms, and a double-acting fluid-pressure cylinder mounted on said hub and having a piston rack geared to one of the stitcher arms.

7. In a tire-building machine, the combination of a substantially cylindrical rotary tire drum, a rocking support pivoted below and at the rear of said drum, on an axis substantially parallel with the axis of rotation of the drum, and a stitcher arm carrying a stitcher and pivoted on said support for feed movement of said stitcher in planes parallel with said drum axis.

8. In a tire-building machine, the combination of a substantially cylindrical, rotary tire drum, a stitcher having feeding and return movements thereover, longitudinally of the drum axis, and also having a movement radially of said axis to carry it into and out of operative position, and means operating independently of the drum for positively imparting said feeding and return movements to the stitcher.

9. In a band-building machine, the combination of a substantially cylindrical, rotary tire drum, a rocking stitcher support pivoted on an axis parallel to that of said drum and having means for rocking it to project and retract the stitchers into and out of operative position, a pair of stitchers carried by said support and connected for opposite feed movements thereover, longitudinally of the drum axis, and means independent of the drum for positively imparting said feed movements in both directions to the stitchers.

10. An apparatus for manufacturing tires in pulley band form, comprising in combination, a rotatable drum upon which the band may be built, a movable support, a pair of arms movably connected to said support, a stitching wheel carried by the free end of each arm, means for operating said support to press the stitching wheels against said band, an arm-actuating device, and connections between said device and said arms operable to move the latter simultaneously in opposite directions on said band.

11. An apparatus for manufacturing tires in pulley band form, comprising in combination, a rotatable drum upon which the band may be built, a movable support, a pair of arms pivotally connected to said support, a stitching wheel carried by the free end of each arm, a sector gear fast to the pivoted end of each arm, the sector gears being intermeshed, a rack in mesh with one of said sector gears, means for moving said support so as to press the stitching wheels against the band, and an arm-actuating device connected with said rack, whereby the arms are moved simultaneously toward or away from each other on said drum.

12. An apparatus for manufacturing tires in pulley band form, comprising in combination, a rotatable drum upon which the band may be built, a pair of pivoted arms, stitchers at the free ends of each of said arms, means for moving said arms to shift the stitchers simultaneously in opposite directions on said band, and means for maintaining the axes of rotation of the stitchers substantially in parallelism.

13. In a tire-building machine, the combination of a rotary drum, a stitcher arm pivoted for lateral swinging feed and return movements thereover, a stitcher wheel mounted for rocking movement on said arm, and means for automatically maintaining the plane of said wheel in parallelism with itself in the various angular positions of said arm.

14. In a tire-building machine, the combination of a rotary drum, a pair of pivoted stitcher arms mounted tangentwise of the drum and interconnected for opposite swinging movements thereover, a pair of stitcher wheels mounted on rockers carried by the arms, and link means connected with the rockers for automatically maintaining the plane of each stitcher wheel in parallelism with itself in the various angular positions of its arm.

15. In a tire-building machine, the combination of a rotary drum for building substantially flat tire bands, means for rotating said drum, a stitcher mounted for positioning movement and also for lateral feeding and return movements with respect to said drum, a motor device for imparting said positioning movement, and a second motor device independent of the first motor device and of the drum-rotating means for positively imparting said feeding and return movements.

16. In a tire-building machine, the combination of a rotary drum, stitcher means mounted for lateral feeding and return movements thereover and biased to move away from said drum to an inoperative position, and a fluid-pressure device controlled by the traverse of the stitcher means for projecting the latter against the drum.

17. In a tire-building machine, the combination of a rotary tire form, a stitcher, a fluid-pressure cylinder for moving said stitcher into position against said form, mechanism including a second fluid-pressure cylinder for imparting to the stitcher a lateral feed movement over the tire form, and a valve device controlled by the feeding traverse of the stitcher and having one position for charging both of said cylinders and another position for discharging both of them.

18. In a tire-building machine, the combination of a rotary drum, a stitcher mounted for lateral feeding and return movements thereover, a double-acting fluid-pressure ram device for imparting said movements, and a valve device controlled by the traverse of said stitcher and controlling said ram device.

19. In a tire-building machine, the combination of a rotary tire form, a rocking member mounted adjacent thereto, stitcher means carried by said rocking member and movable over the drum, mechanism including fluid-pressure devices for operating said rocking member and said stitcher means, and a valve device carried by said rocking member and controlled by the traverse of the stitcher means for controlling said fluid-pressure devices.

20. In a tire-building machine, the combination of a rotary tire form, a pair of pivoted stitcher arms interconnected for opposite swinging movements and having stitcher wheels coacting with said form, a hub carrying the stitcher arms and pivoted for stitcher-positioning movements, and mechanism including fluid-pressure operating and valve devices controlled by the traverse of the stitcher arms for rocking said hub and swinging the stitcher arms.

In witness whereof I have hereunto set my hand this 30th day of November, 1929.

FLORAIN J. SHOOK.